(12) United States Patent
Hori et al.

(10) Patent No.: US 6,454,199 B1
(45) Date of Patent: Sep. 24, 2002

(54) PRETENSIONER

(75) Inventors: Seiji Hori; Tomonori Nagata, both of Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 09/531,007

(22) Filed: Mar. 20, 2000

(30) Foreign Application Priority Data

Apr. 16, 1999 (JP) .......................................... 11-109680

(51) Int. Cl.[7] .............................................. B65H 75/48
(52) U.S. Cl. ........................................................ 242/374
(58) Field of Search ........................ 242/374; 280/806; 297/478

(56) References Cited

U.S. PATENT DOCUMENTS

| | | | | |
|---|---|---|---|---|
| 360,393 A | * | 3/1887 | Rogers | 192/45 |
| 5,443,222 A | * | 8/1995 | Modinger et al. | 242/374 |
| 5,624,083 A | * | 4/1997 | Modinger et al. | 242/374 |
| 5,699,976 A | * | 12/1997 | Hori | 242/374 |
| 5,794,876 A | * | 8/1998 | Morizane et al. | 242/374 |
| 5,842,344 A | * | 12/1998 | Schmid | 60/632 |
| 6,244,531 B1 | * | 6/2001 | Hori et al. | 242/374 |

FOREIGN PATENT DOCUMENTS

| | | | |
|---|---|---|---|
| GB | 2312827 | * | 12/1997 |
| JP | 7-156751 | | 6/1995 |
| JP | 8-72671 | * | 3/1996 |
| JP | 08-133015 | | 5/1996 |
| JP | 09-164912 | | 6/1997 |
| JP | 09-226519 | | 9/1997 |
| JP | 11-227566 | * | 8/1999 |
| JP | 11247906 | * | 9/1999 |
| JP | 11-314557 | | 11/1999 |

* cited by examiner

Primary Examiner—Donald P. Walsh
Assistant Examiner—David A. Jones
(74) Attorney, Agent, or Firm—Nixon Peabody LLP; Thomas W. Cole

(57) ABSTRACT

There is provided a pretensioner which can as a whole be made smaller. A rack and pinion type pretensioner is disposed outside a second leg plate of a webbing take-up device. A driving mechanism of the pretensioner includes, as principal components, a piston formed as a rack bar, and a pinion. The pinion includes a toothed portion and a clutch portion, and is directly connected to a winding shaft. Accordingly, as compared with a conventional system in which intermediate gears are disposed between the pinion and the rack bar, the pretensioner can as a whole be made smaller both in radial and axial directions thereof.

7 Claims, 13 Drawing Sheets

110

110

PRETENSIONER

BACKGROUND OF THE INVENTION

1. Field of the Invention

The present invention relates to a pretensioner integrated with a webbing take-up device in which a vehicle occupant-restraining webbing is wound on a winding shaft in a layered form, and rotating the winding shaft by a predetermined amount in a direction in which the webbing is taken up by a rack and pinion type driving mechanism instantaneously with rapid deceleration of a vehicle.

2. Description of the Related Art

There has conventionally been used a so-called pretensioner which causes a winding shaft to rotate by a predetermined amount in a direction in which a webbing is taken up instantaneously with rapid deceleration of a vehicle so as to improve an ability of restraining a vehicle occupant by a webbing.

Various types of driving mechanism of such a pretensioner have been examined and put to practical use. A pretensioner using a rack and pinion type driving mechanism which is disclosed in Japanese Patent Application Laid-Open (JP-A) No. 7-156751 will be described below.

In the pretensioner disclosed therein, a cylindrical pipe is mounted to a housing provided at a side portion of a webbing take-up device. A hollow piston is inserted into the cylindrical pipe so as to be movable in an axial direction of the pipe, and gunpowder and an ignition device are disposed within the piston. Further, rack teeth are formed at a predetermined position on the outer periphery of the piston and along the axial direction of the piston, and the piston itself functions as a rack bar.

A notch is formed at a predetermined position on the cylindrical pipe in the axial direction of the pipe, and pinion teeth of a pinion comes into the cylindrical pipe from the notch so as to be engageable with the rack teeth. A first gear wheel whose diameter is larger than that of the pinion is coaxially connected to the pinion, and the first gear wheel engages with a second gear wheel. The second gear wheel is integrated with a coupling wheel which functions as a clutch. The second gear wheel is connected to an axial end of the winding shaft of the webbing take-up device via the coupling wheel.

In the above-described structure, when a vehicle decelerates rapidly, gunpowder fires by the ignition device, and thrust generated during the ignition causes the piston (rack bar) to move within the cylindrical pipe in the axial direction. As a result, the pinion engaging with the rack teeth of the piston rotates around its axis so as to rotate the first gear wheel and the second gear wheel. The coupling wheel connected to the axial end of the winding shaft is integrated with the second gear wheel, and therefore, when the second gear wheel rotates, the winding shaft is rotated via the coupling wheel in the direction in which the webbing is taken up.

However, in the above-described structure, not only the pinion but also intermediate gears such as the first gear wheel and the second gear wheel are interposed between the piston (rack bar) serving as a driving starting point and the winding shaft serving as a driving end point, and therefore, a space for installation of these intermediate gears becomes necessary in the housing of the pretensioner. Accordingly, there arises a problem in that the pretensioner be as a whole made larger both in the radial and axial directions thereof.

SUMMARY OF THE INVENTION

In view of the above-described facts, an object of the present invention is to provide a pretensioner which can be made smaller as a whole.

A first aspect of the present invention is a pretensioner which is integrated with a webbing take-up device in which a vehicle occupant-restraining webbing is wound on a winding shaft, and at the time of rapid deceleration of a vehicle, which rotates the winding shaft by a predetermined amount in a direction in which the webbing is taken up by using a rack and pinion type driving mechanism, wherein the driving mechanism comprises: a piston disposed so as to be movable in a cylinder in an axial direction thereof and including a rack portion provided with rack teeth, the piston being provided to move at the time of rapid deceleration of the vehicle; and a pinion disposed so as to engage with the rack teeth and directly connected to an axial end of the winding shaft via a clutch which. is connected to the winding shaft, only at the time of rapid deceleration of the vehicle.

In accordance with a second aspect of the present invention, in the structure provided by the first aspect, the pinion includes a toothed portion in which pinion teeth engaging with the rack teeth are formed, and a clutch portion formed coaxially and integrally with the toothed portion and including the clutch at the side of an inner periphery thereof.

In accordance with a third aspect of the present invention, in the structure provided by the second aspect, the piston includes a piston portion to which gas pressure is applied, and the rack portion is made upright at a position offset from the center of the piston portion, the rack portion being disposed so as to move within a range of dimension of an outer diameter of the clutch portion.

In accordance with a fourth aspect of the present invention, in the structure provided by the second aspect, the rack portion is disposed so that a total length, in a predetermined direction, of the toothed portion and the rack portion in an engaged state is less than or equal to a dimension of an outer diameter of the clutch portion, the predetermined direction being a direction substantially perpendicular to a direction of a rotating shaft of the pinion and to a direction. to which the rack portion moves.

According to the first aspect of the present invention, when a vehicle decelerates rapidly, the pretensioner integrated with the webbing take-up device operates. Specifically, the piston (including the rack portion provided with rack teeth), which is disposed within the cylinder and is formed as a rack bar, moves in an axial direction of the piston. When the piston moves in the axial direction, the pinion disposed so as to engage with the rack teeth of the piston is rotated. The pinion provided in the present invention is directly connected to an axial end of the winding shaft via the clutch which is connected to the winding shaft only at the time of rapid deceleration of the vehicle. Therefore, when the pinion rotates, the winding shaft is rotated via the clutch in the direction in which the webbing is taken up. As a result, the vehicle occupant-restraining webbing is instantaneously taken up by an amount corresponding to a moving stroke of the piston and an ability of restraining a vehicle occupant by a webbing is thereby improved.

In the present invention, since the pinion which rotates due to driving force of the piston formed as the rack bar is directly connected to the axial end of the winding shaft via the clutch, intermediate gears as used in a conventional system become unnecessary. For this reason, it is not necessary that a space of installation for the intermediate gears be provided in the pretensioner. Accordingly, the pretensioner can as a whole be made smaller both in axial and radial directions thereof.

According to the second aspect of the present invention, the pinion is structured so as to include the toothed portion and the clutch portion which are integrated with each other. Therefore, as compared with a case in which the toothed portion and the clutch portion are separately provided, the space of installation can be further reduced and the number of parts can also be reduced.

According to the third aspect of the present invention, the piston includes the piston portion, and the rack portion is made upright at a position offset from the center of the piston portion and is also disposed so as to move in an axial direction of the piston within the range of dimension of the outer diameter of the clutch portion. As a result, a rack and pinion type driving mechanism can be prevented from being made larger outwardly in the radial direction of the clutch portion.

DESCRIPTION OF THE PREFERRED EMBODIMENTS

Referring now to FIGS. 1 to 13, a description will be hereinafter given of a webbing take-up device 10 with which a pretensioner 100 according to an embodiment of the present invention is integrated.

First, a spool 12 of the webbing take-up device 10 and a structure of parts integrated therewith, and a locking structure and the like will be described. Next, the structure of the pretensioner 100 which is a principal portion of the present embodiment will be described.

[Spool 12 and Structure of Parts Integrated Therewith]

Figure 1:
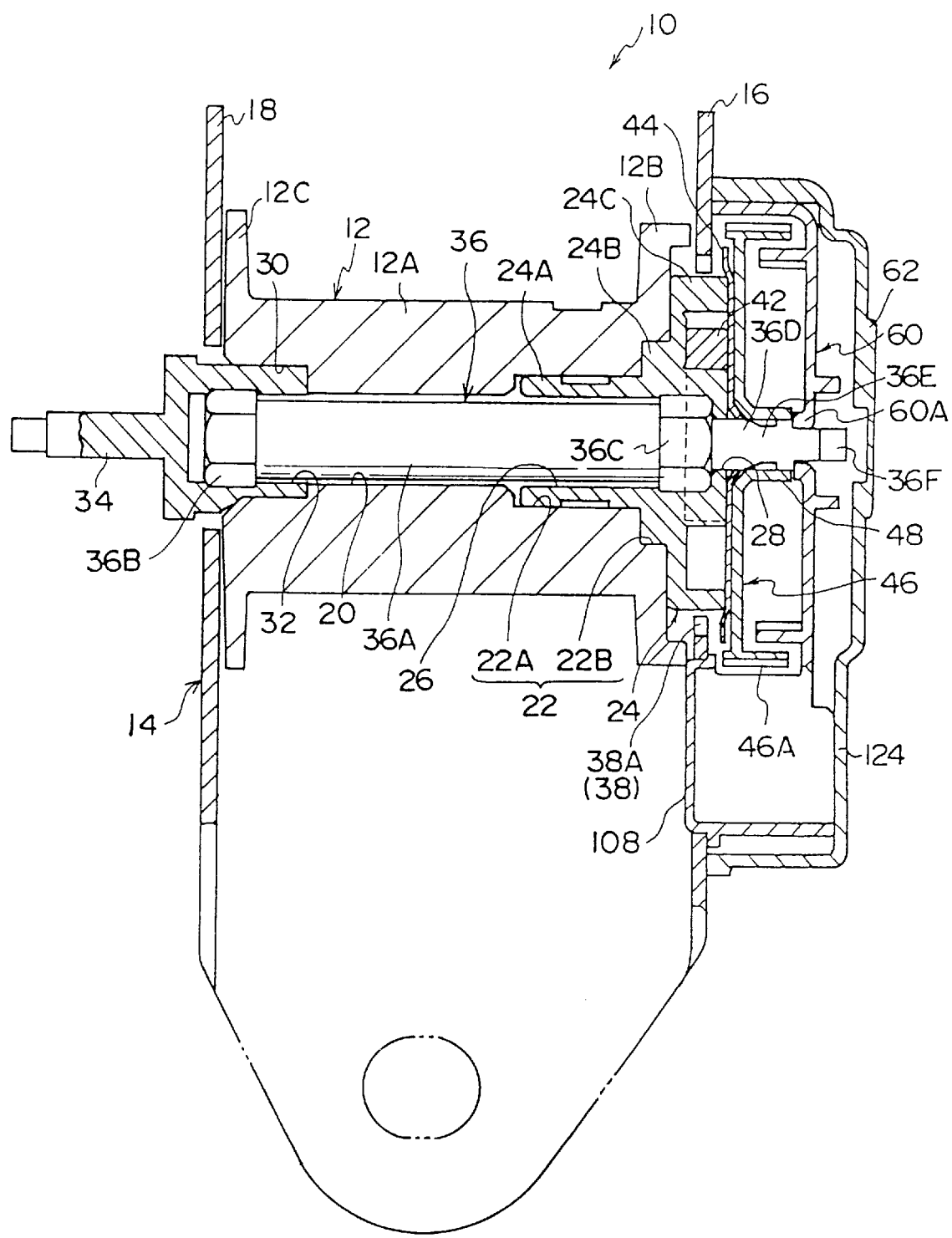
FIG. 1 is a longitudinal cross sectional view showing an overall structure of a webbing take-up device according to an embodiment of the present invention.

FIG. 1 shows a longitudinal cross section which illustrates an overall structure of the webbing take-up device 10 according to the embodiment of the present invention. As illustrated in this figure, the webbing take-up device 10 includes a frame 14 having a substantially U-shaped configuration when seen from the top, and the frame 14 is fixed to the side of a vehicle body. The frame 14 includes a first leg plate 16 and a second leg plate 18 extending therefrom parallel with each other. A spool 12 formed by die casting is supported rotatably between the first leg plate 16 and the second leg plate 18.

The spool 12 is comprised of a cylindrical spool shaft 12A which includes an axial core portion and on which one end of a webbing 126 (see FIG. 10) for restraining a vehicle occupant is fastened, and a pair of flange portions which are each formed substantially in the shape of a hollow circular plate at each of both ends of the spool shaft 12A (a flange portion disposed at the side of the first leg plate 16 will be hereinafter referred to as "first flange portion 12B" and a flange portion disposed at the side of the second leg plate 18 will be hereinafter referred to as "second flange portion 12C"). The spool 12 has, as a whole, a substantially hourglass-shaped configuration.

A shaft insertion hole 20 is formed in the axial core portion of the spool shaft 12A. A base lock receiving portion 22 of which diameter is larger than a hole diameter of a central portion of the shaft insertion hole 20 is provided in the shaft insertion hole 20 at the side of the first flange portion 12B, and is formed so as to be coaxial with the shaft insertion hole 20. The base lock receiving portion 22 is comprised of a main body 22A formed by the most part thereof, and an end portion 22B of which diameter is larger than the main body 22A.

A base lock 24 formed by die casting is mounted in the base lock receiving portion 22 in a state of being prevented from coming out from the base lock receiving portion 22. The base lock 24 is mounted in such a manner that after insertion of the base lock 24 into the base lock receiving portion 22, a stopper (not shown), serving as a come-out preventing member, which has a substantially U-shaped configuration when seen from the front is pressed therein from a direction perpendicular to the axial line. Further, in the present embodiment, the base lock 24 is manufactured by die casting, but there is not necessarily need to use the die casting. As is clear from an operation and effects, which will be described later, it suffices that the base lock 24 may be formed of a material which, when the base lock 24 contacts by pressure ratchet teeth 38A at the time of rapid deceleration of a vehicle, can be engaged with the ratchet teeth 38A due to plastic deformation thereof.

The base lock 24 is formed in the shape of a cylinder of which outer peripheral diameter varies along the axial direction thereof. The base lock 24 is comprised of a base portion 24A fitted into the main body 22A of the base lock receiving portion 22, an intermediate portion 24B of which diameter is larger than an outer peripheral diameter of the base portion 24A and which is fitted into the end portion 22B of the base lock receiving portion 22, and a holding portion 24C of which diameter is larger than an outer peripheral diameter of the intermediate portion 24B and which is disposed in contact with an outer side surface of the first flange portion 12B. Further, an engagement hole 26 in the shape of a hexagon hole is formed in a portion of the axial core portion of the base lock 24 other than an outer end of the axial core portion (which end is located at the side of the holding portion 24C in the axial core portion of the base lock 24). Moreover, a small hole 28 of which diameter is smaller than the hole diameter of the engagement hole 26 is formed at the outer end of the axial core portion in such a manner as to communicate with the engagement hole 26.

A sleeve receiving portion 30 of which diameter is larger than a hole diameter of the central portion of the shaft insertion hole 20 is formed in the shaft insertion hole 20 of the spool shaft 12A at the side of the second flange portion 12C. A sleeve 34 is fitted in the sleeve receiving portion 30 by using serration treatment or spline treatment. The sleeve 34 is comprised of a base portion 34A formed substantially in the shape of a cylinder and having a hexagon hole-shaped engagement hole 32 formed in an axial core portion thereof, an intermediate portion 34B formed adjacent to the base portion 34A and having an outer peripheral surface subjected to parallel knurling, and a small diameter portion 34C protruded from an end and an axial core portion of the intermediate portion 34B. An inner end of urging means (a power spring) for urging to rotate the spool 12 in the direction in which the webbing is taken up is fastened at the small diameter portion 34C of the sleeve 34 via an adapter (not shown).

Figure 4:
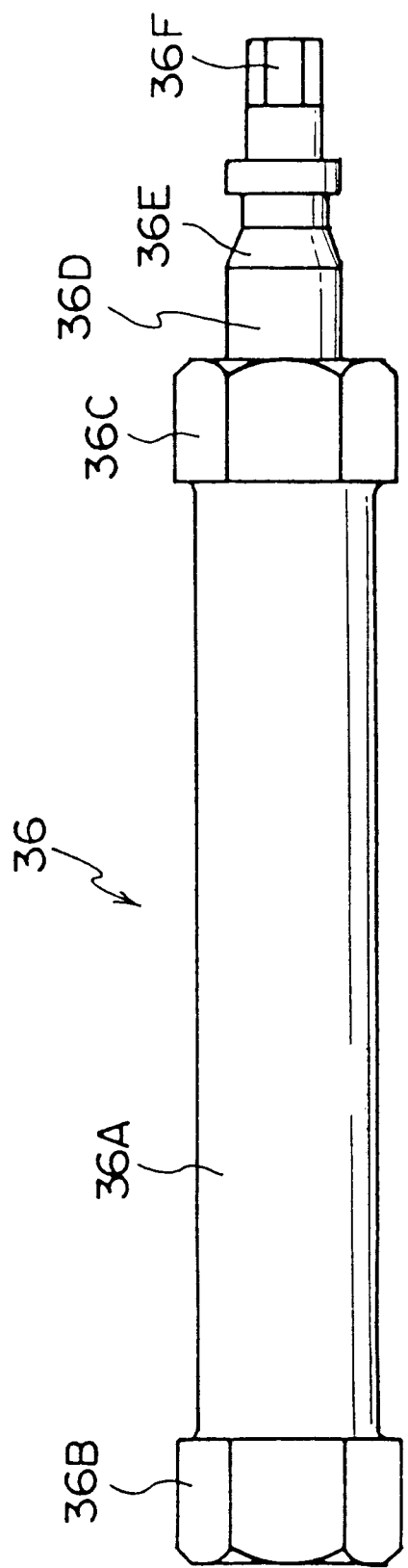
FIG. 4 is a front view of a torsion shaft shown in FIG. 1.
Figure 5:
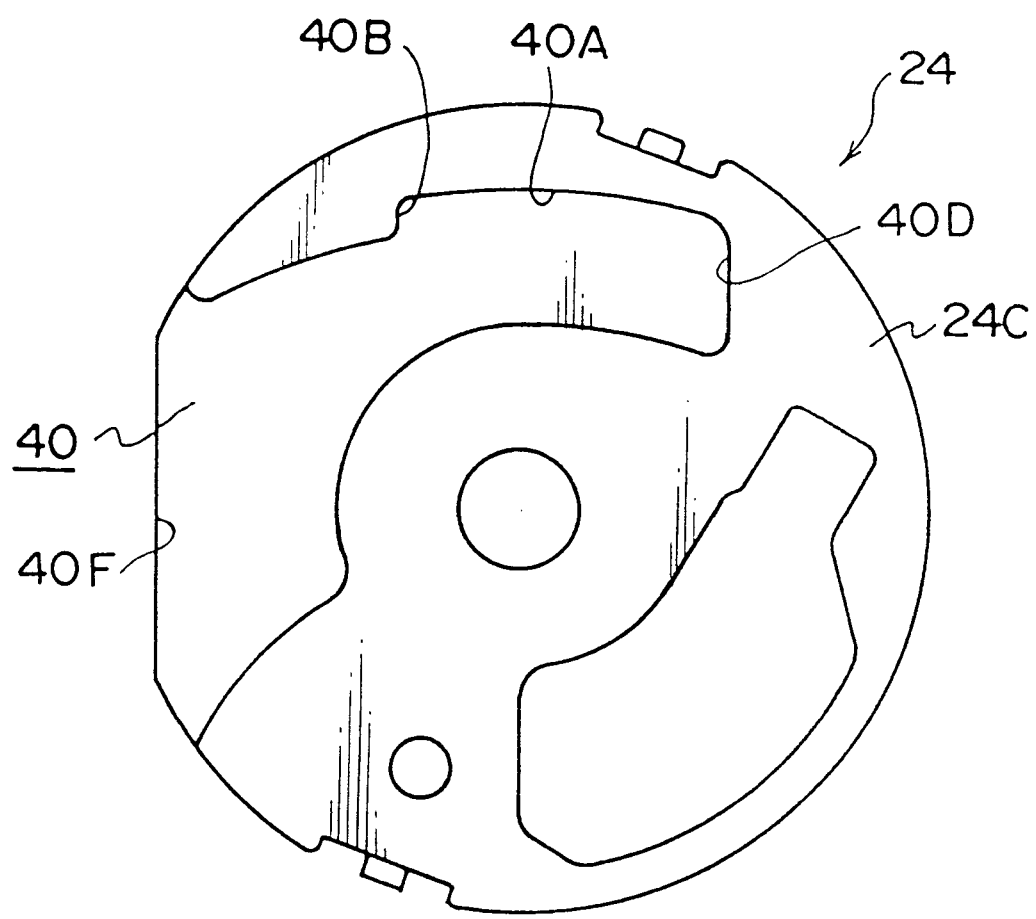
FIG. 5 is a side view of a base lock shown in FIG. 1.

The above-described base lock 24 and sleeve 34 are connected with each other by a torsion shaft 36. As also illustrated in FIG. 4, the torsion shaft 36 is comprised of a shaft portion 36A which forms a principal portion thereof, a hexagonal head portion 36B formed at one end of the shaft portion 36A, a hexagonal engaging portion 36C formed at another end of the shaft portion 36A, a small diameter portion 36D extending from an end of an axial core portion of the engaging portion 36C so as to be coaxial with the shaft portion 36A, a gear holding portion 36E extending from the small diameter portion 36D so as to be coaxial with the shaft portion 36A, and an end portion 36F extending from the gear holding portion 36E in such a manner as to be coaxial with the shaft portion 36A and having a key formed therein. The gear holding portion 36E further includes a tapered portion of which diameter is gradually reduced along an axial direction of the shaft, a diameter-reduced portion of which diameter is smaller than that of the small diameter portion 36D, and a diameter-enlarged portion of which diameter is larger than the diameter-reduced portion. Referring again to FIG. 1, the head portion 36B of the torsion shaft 36 is fitted in the hexagon hole-shaped engagement hole 32 formed in the sleeve 34 and the engaging portion 36C of the torsion shaft 36 is fitted in the hexagon hole-shaped engagement hole 26 formed in the base lock 24. As a result, the torsion shaft 36 is integrated with the spool shaft 12A via the base lock 24 and the sleeve 34. The torsion shaft 36 having the above-described structure is a principal component of a force limiter which, when a webbing tension having a predetermined value or more acts on the spool 12 at the time of rapid deceleration of a vehicle, is distorted and deforms so as to absorb energy.

In the above-described structure, the spool 12, the base lock 24, the sleeve 34, and the torsion shaft 36 correspond to the "winding shaft" in the present invention.

[Locking Structure]

Figure 2:
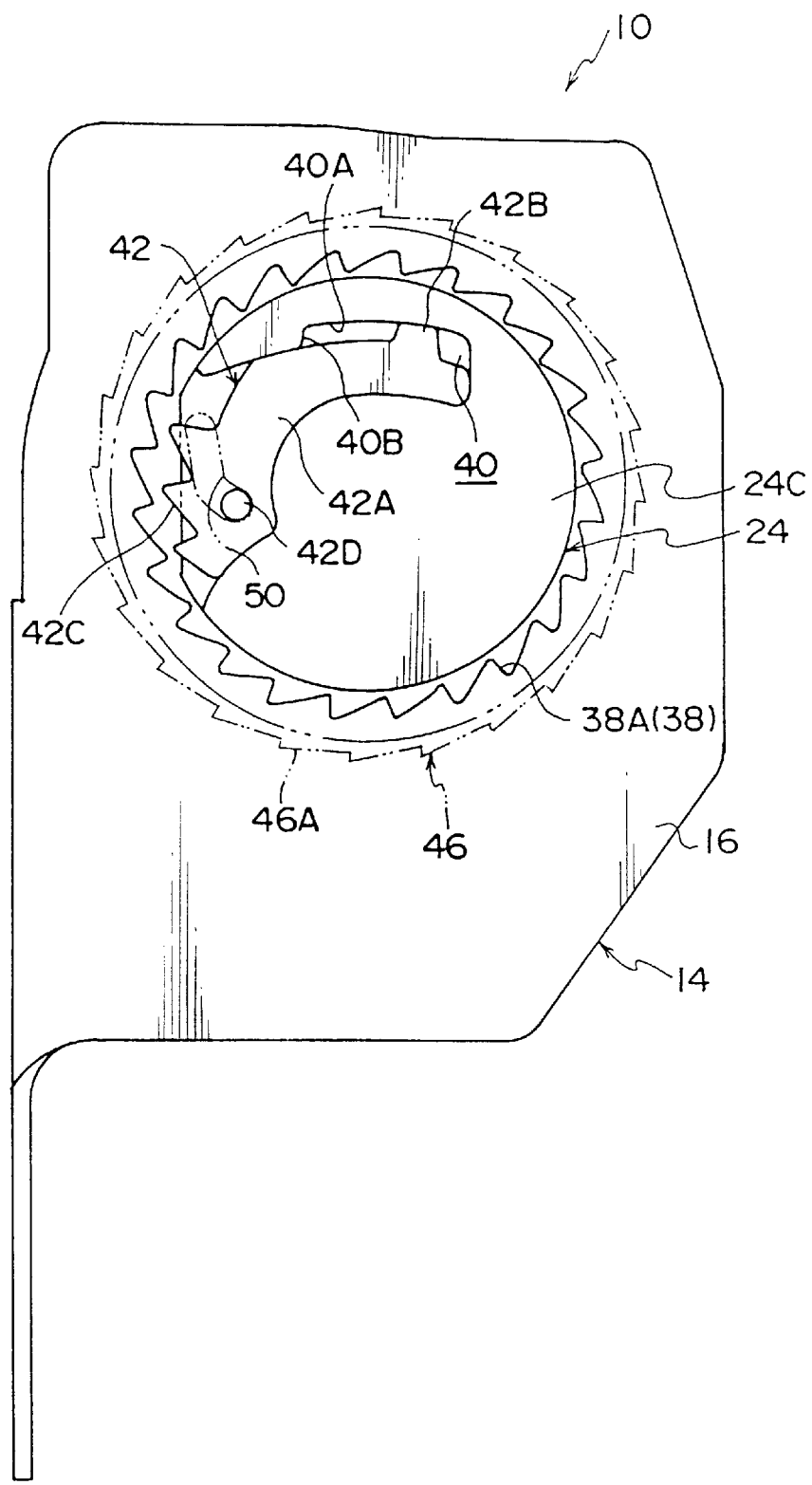
FIG. 2 is a side view showing the webbing take-up device according to the embodiment of the present invention in an unlocked state.
Figure 3:
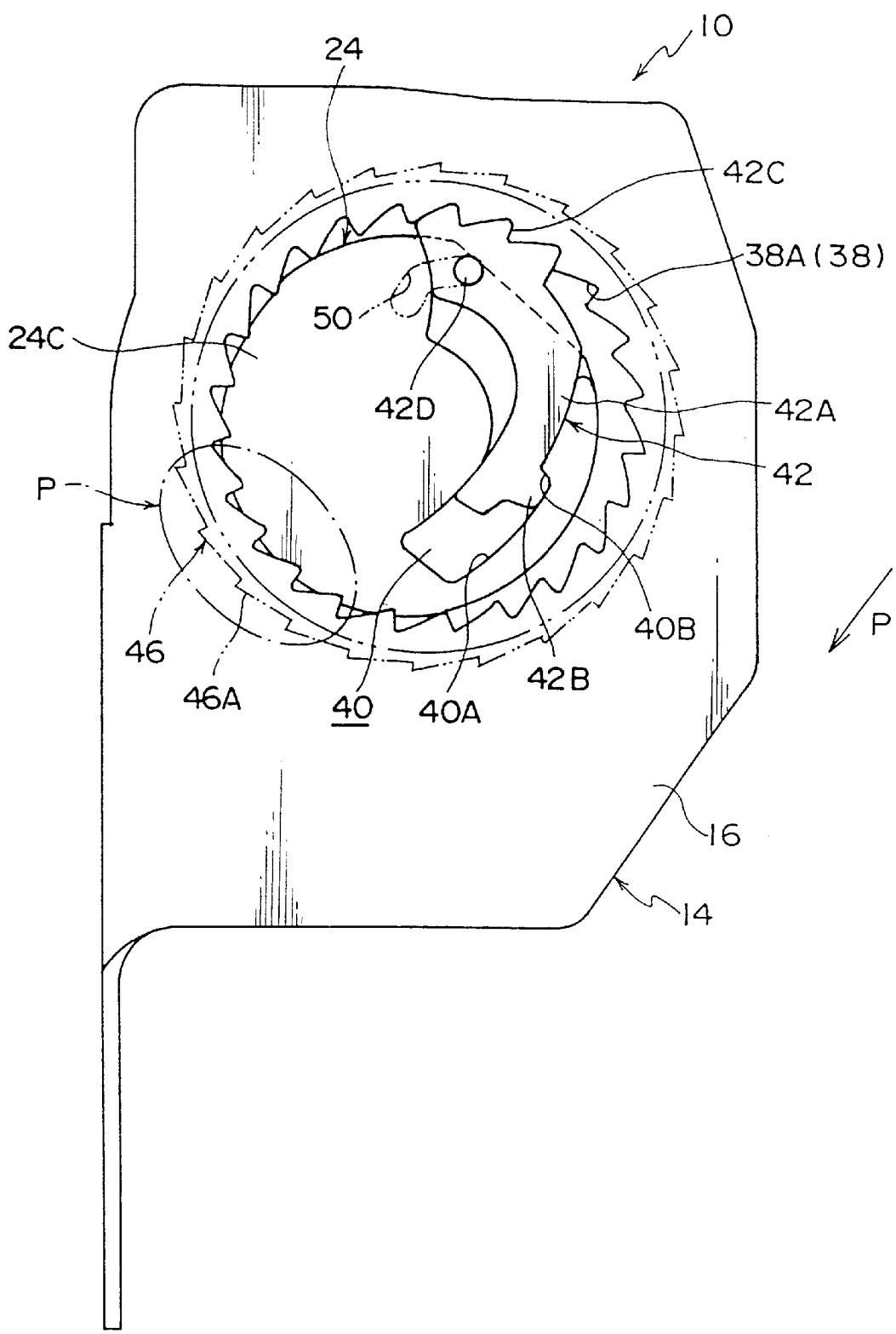
FIG. 3 is a side view showing the webbing take-up device according to the embodiment of the present invention in a locked state.

As illustrated in FIG. 2 and also in FIG. 3, an internal gear ratchet 38 is formed by punching in an upper portion of the first leg portion 16 of the frame 14. Ratchet teeth 38A of the internal gear ratchet 38 are set so as to have a high strength.

The holding portion 24C of the base lock 24 is disposed at an inner side of the internal gear ratchet 38. The small diameter portion 36D of the torsion shaft 36 is inserted in the above-described small hole 28 formed at the end of the axial core portion of the holding portion 24C. A concave accommodating portion 40 (see FIGS. 2, 3, and 5) formed around the small hole 28 substantially in the shape of an arc along the outer periphery of the holding portion 24C is formed at the front side of the holding portion 24C (at an end of the holding portion 24C at the right side on the paper of FIG. 1). One end 40D of the accommodating portion 40 is closed and the other end is opened. The other end 40F of the accommodating portion 40 of the holding portion 24C in the base lock 24 is chamfered so as not to prevent engagement between a lock plate 42 with the internal gear ratchet 38, which will be described later. The accommodating portion 40 accommodates a single lock plate 42 (see FIGS. 2, 3, and 6) having a substantially arc-shaped plate based on the shape of the accommodating portion 40. Further, a thin-walled lock cover 44 having the shape of a circular plate is mounted at an outer surface of the holding portion 24C of the base lock 24 in a state of stopping rotating so as to prevent falling of the lock plate 42.

Figure 6:
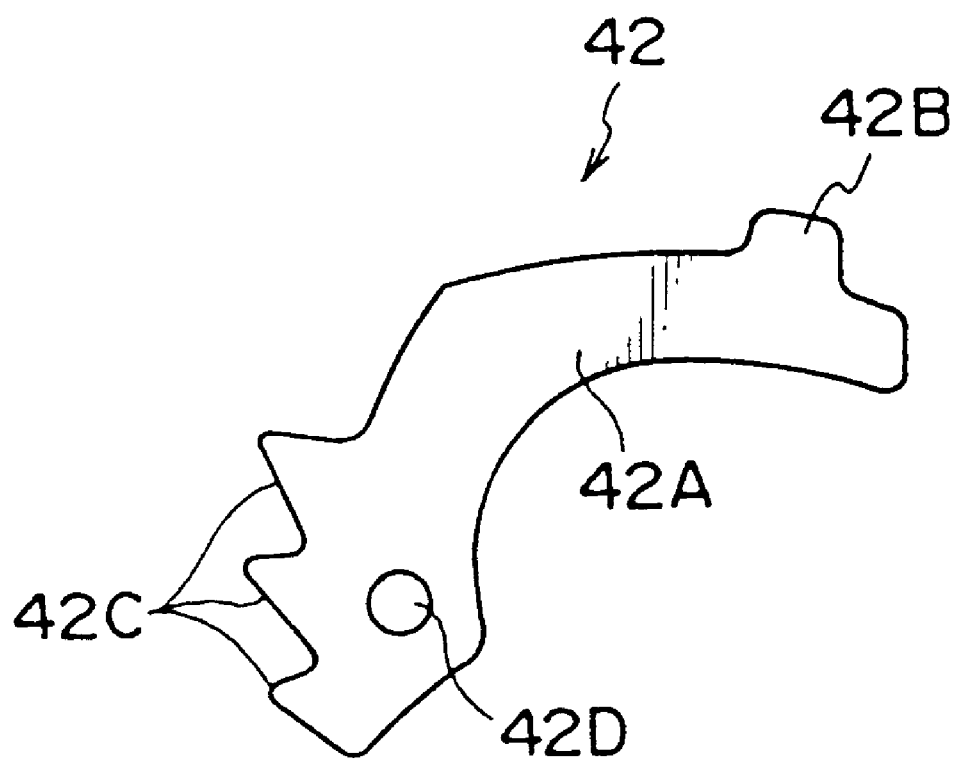
FIG. 6 is a front view of a lock plate shown in FIG. 1.

As illustrated in FIG. 6 and the like, the lock plate 42 is comprised of a metallic plate main body 42A formed as a substantially arc-shaped plate, a rectangular protruding portion 42B extending from one end of the plate main body 42A substantially in a radial direction of the arc, that is, in a direction perpendicular to the plate main body 42A (namely, in a direction in which the lock plate 42 moves), high-strength lock teeth 42C formed in the outer periphery of the other end of the plate main body 42A and meshing with the ratchet teeth 38A of the internal gear ratchet 38 in the first leg plate 16, and a guide pin 42D formed to be upright from the other end of the plate main body 42A. A overall dimension of a transverse dimension of the plate main body 42A and a length extending from the plate main body 42A of the protruding portion 42B generally coincides with a transverse dimension of a wide portion 40A (see FIGS. 2 and 3) of the accommodating portion 40 of the base lock 24. The "transverse dimension" mentioned above is a dimension in a direction in which the protruding portion 42B is protruded.

Figure 7:
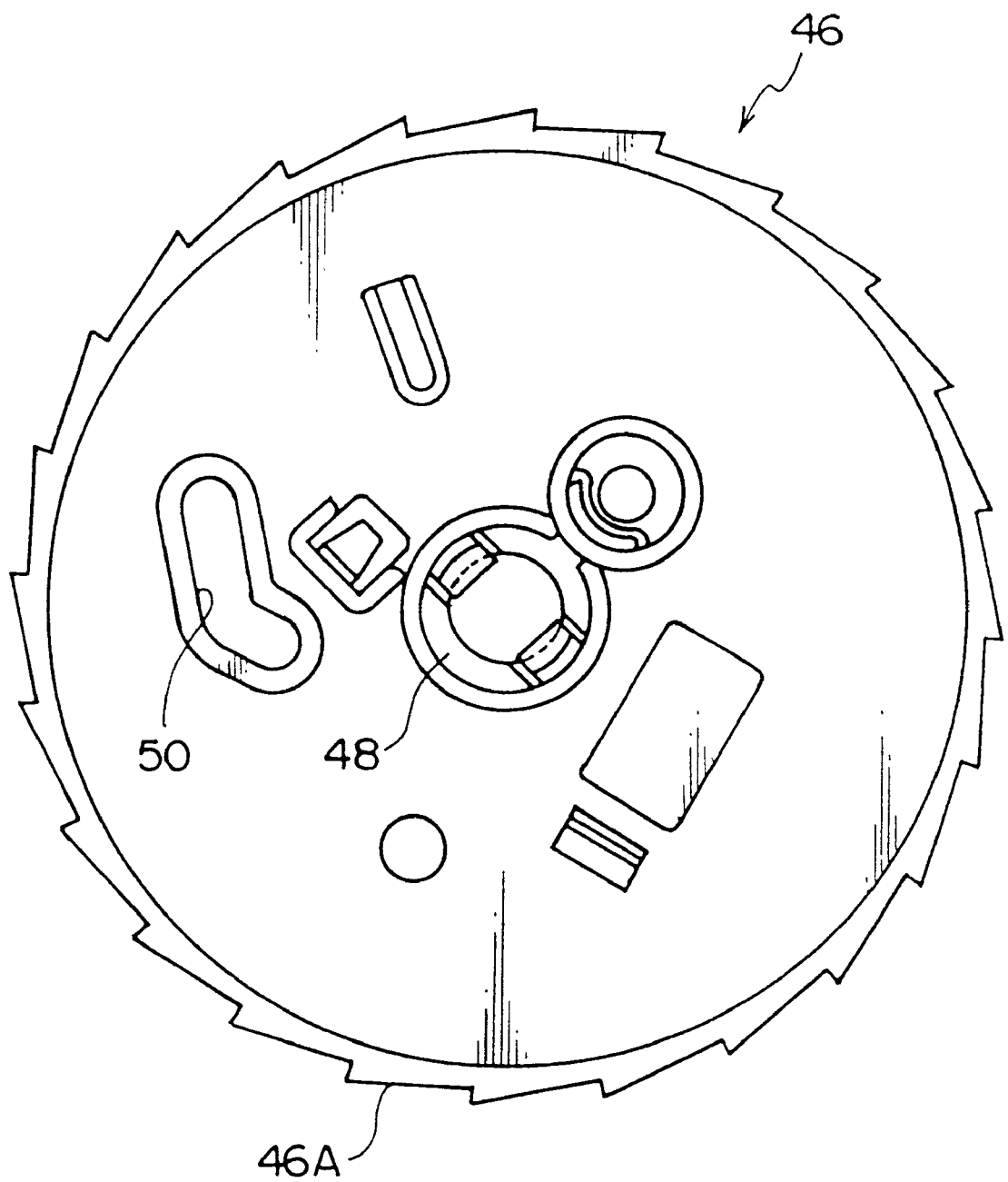
FIG. 7 is a rear view of a V gear shown in FIG. 1.

A substantially circular plate-shaped V gear 46 of which diameter is larger than that of the base lock 24 is disposed adjacent to the base lock 24. As also illustrated in FIG. 7, a cylindrical boss 48 is formed at an axial core portion of the V gear 46 and is supported so as to rotate by following the gear holding portion 36E of the torsion shaft 36. Further, a substantially V-shaped guide hole 50 is formed in the V gear 46 and the guide pin 42D made upright on the lock plate 42 is inserted in the guide hole 50. Moreover, lock teeth 46A are formed in the outer periphery of the V gear 46 so as to be integrated with the V gear 46.

Figure 8:
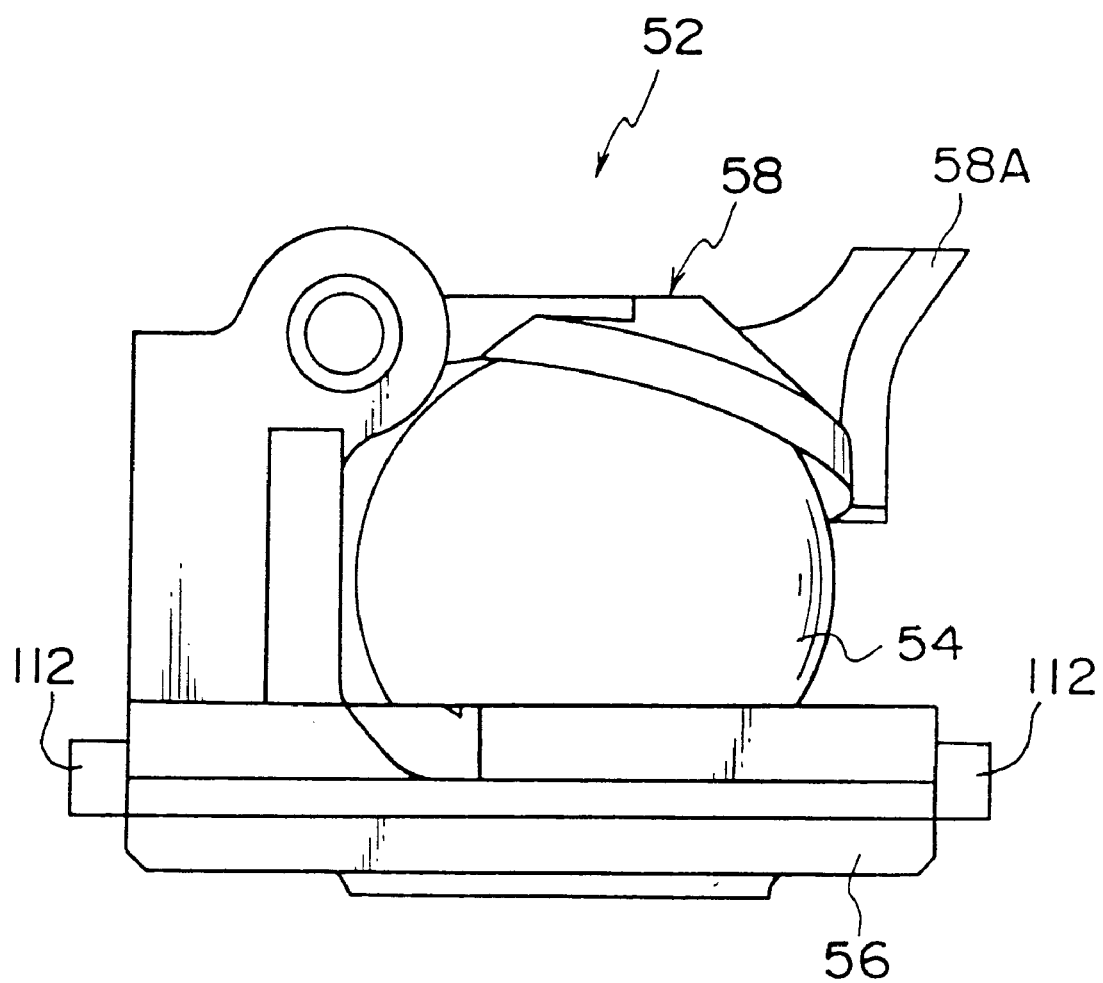
FIG. 8 is a side view of an acceleration sensor not shown in FIG. 1.

A well-known VSIR acceleration sensor 52 shown in FIG. 8 is disposed below the V gear 46. In FIG. 1, the acceleration sensor 52 is not shown. At the time of rapid deceleration of a vehicle, a ball 54 of the acceleration sensor 52 rolls on a sensor housing 56 to swing a sensor lever 58, and a lock pawl 58A of the sensor lever 58 is engaged with the lock tooth 46A of the V gear 46.

Returning to FIG. 1, the above-described acceleration sensor 52 is held by a sensor holder 60 made of resin. A sensor cover 62 made of resin and having a shape similar to that of the sensor holder 60 is disposed at the outer side of the sensor holder 60. The sensor holder 60 and the sensor cover 62 are integrated and fixed to the first leg plate 16 of the frame 14. A short cylindrical boss 60A is formed at the axial core portion of the sensor holder 60 integrally with the sensor holder 60. The boss 60A supports the end portion 36F of the torsion shaft 36. Namely, the sensor holder 60 is allowed to function as a bearing of the torsion shaft 36.

Internal teeth are formed integrally in the inner periphery of the above-described sensor holder 60 in such a manner as to be engageable with a WSIR pawl (not shown) supported by the above-described V gear 46.

[Structure of Pretensioner 100]

Figure 9:
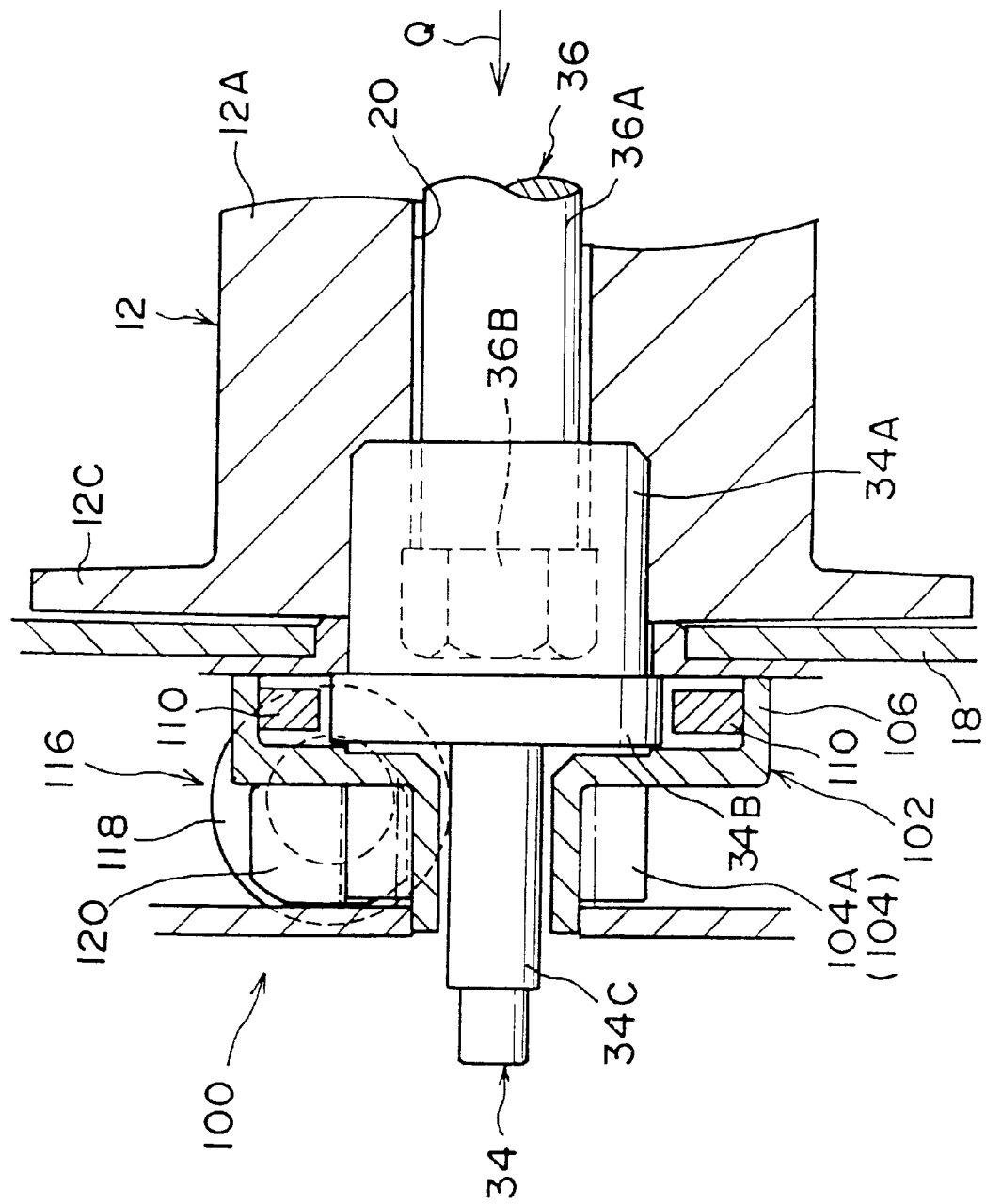
FIG. 9 is an enlarged cross sectional view of a principal portion of a pretensioner integrated with the webbing take-up device.
Figure 10:
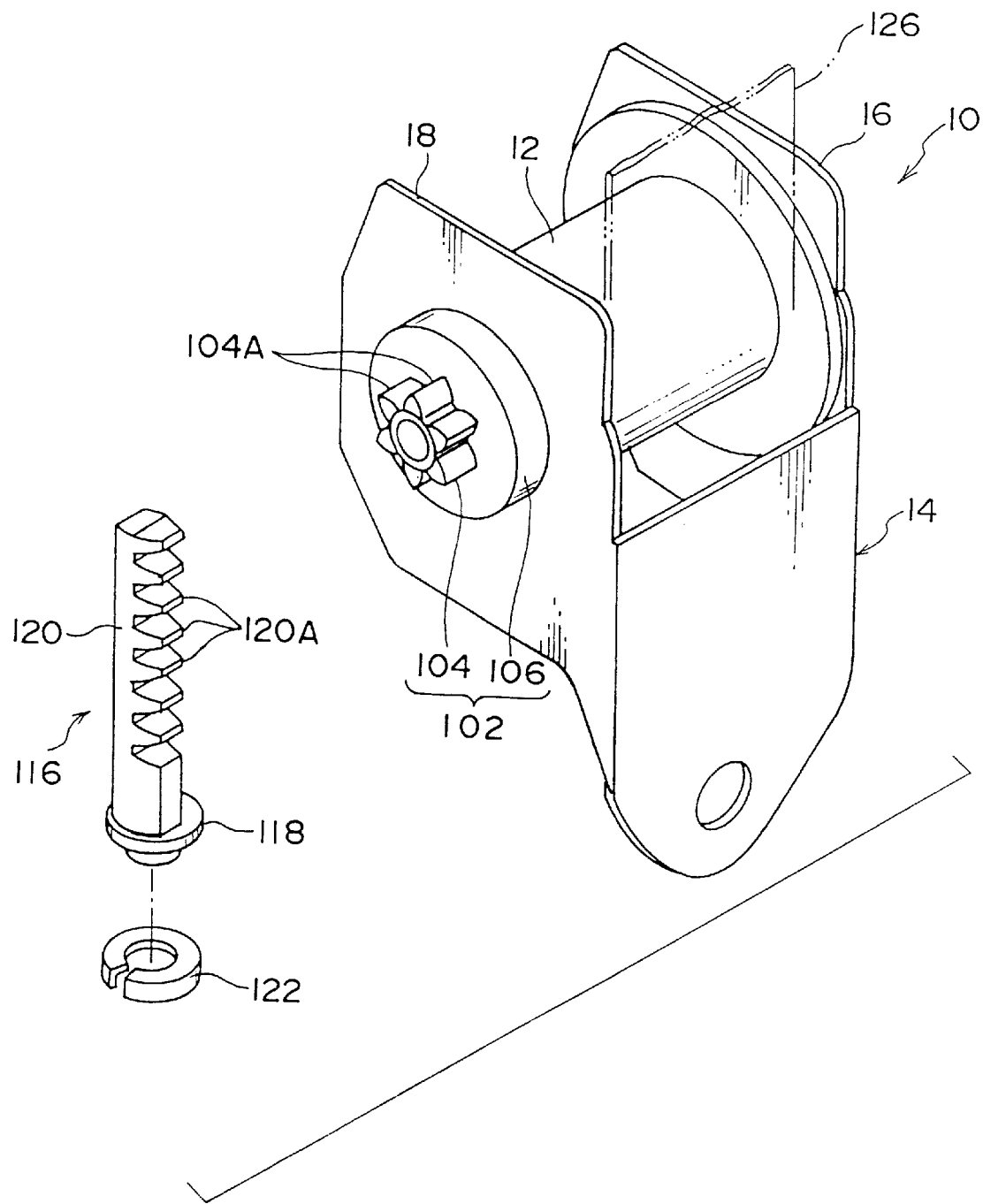
FIG. 10 is a perspective view which shows a rack and pinion type driving mechanism of the pretensioner.
Figure 11:
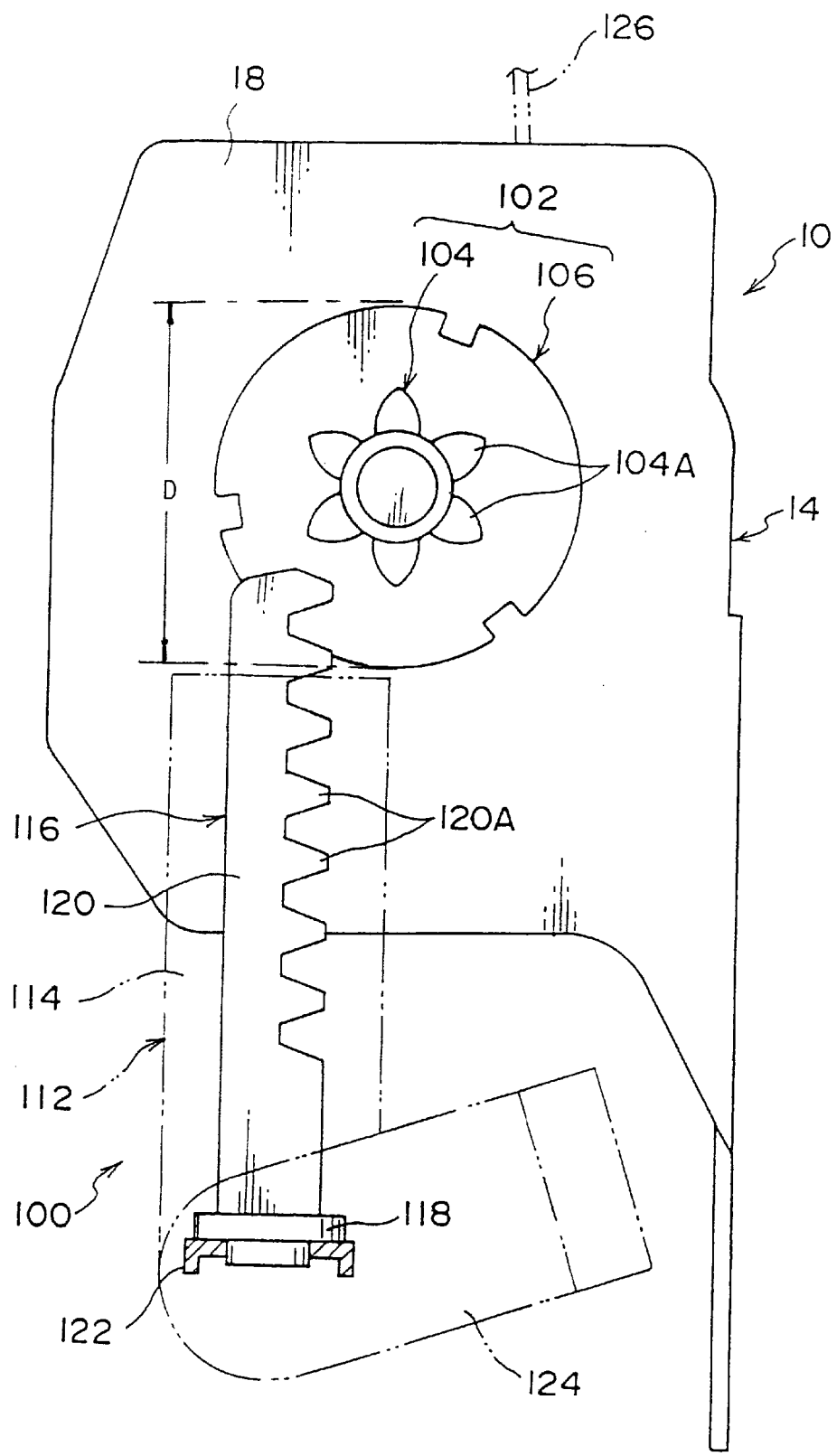
FIG. 11 is a side view which schematically shows the webbing take-up device with which the pretensioner is integrated.

As illustrated in FIGS. 9 to 11, the pretensioner 100 is integrated with the above-described webbing take-up device 10 at the side of the second leg plate 18.

Specifically, the intermediate portion 34B and the small diameter portion 34C of the sleeve 34 mounted to the spool 12 at the side of the second leg plate 18 are disposed so as to project outside the second leg plate 18. The intermediate portion 34B and the small diameter portion 34C are covered by fitting a pinion 102 thereon from the outer peripheral side thereof. The pinion 102 includes a toothed portion 104 covering the small diameter portion 34C of the sleeve 34 and having pinion teeth 104A formed on an outer periphery thereof, and a clutch portion 106 covering the intermediate portion 34B and formed integrally with and adjacent to the toothed portion 104.

Figure 12:
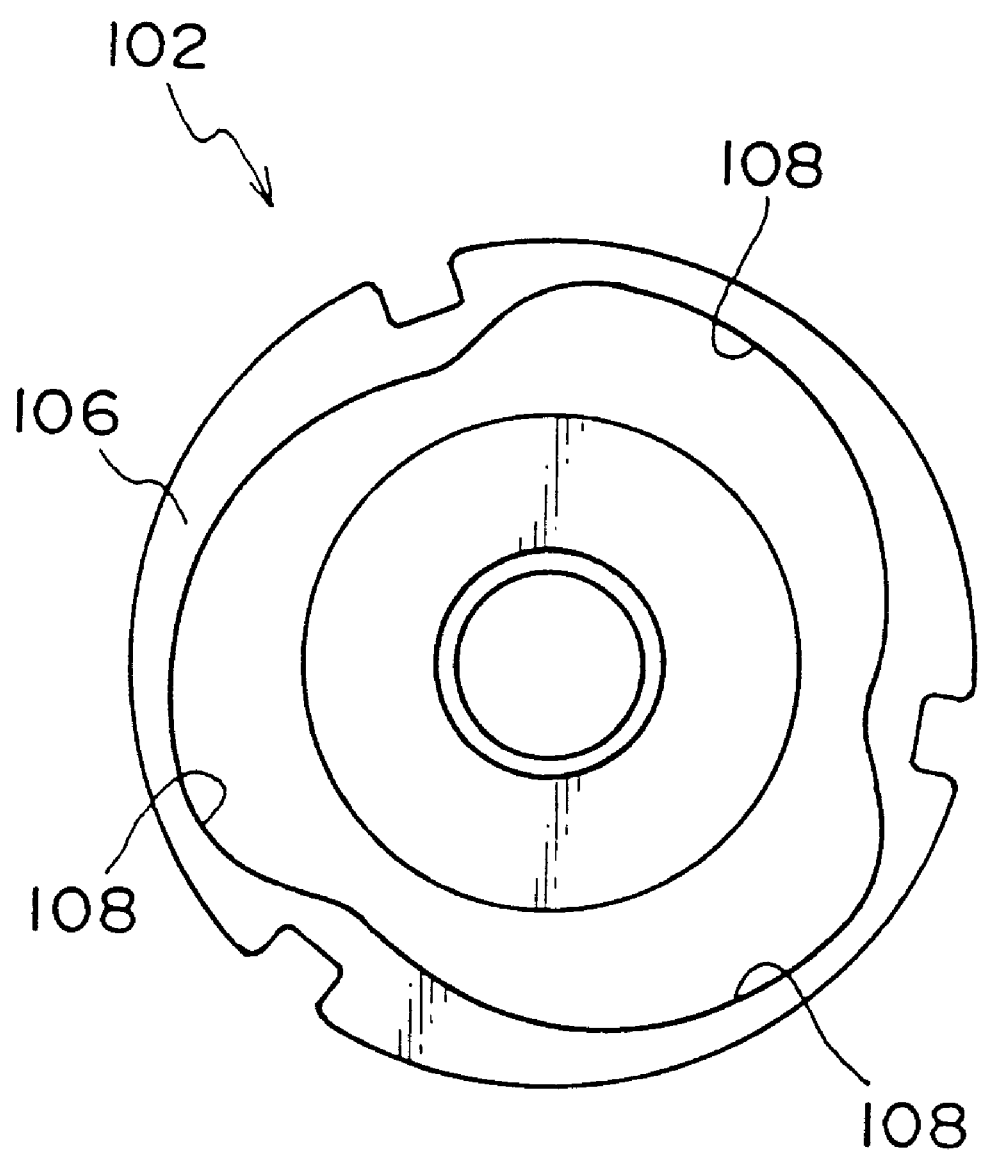
FIG. 12 is a rear view of a pinion shown in FIG. 9 when seen from the direction indicated by arrow Q.
Figure 13A:
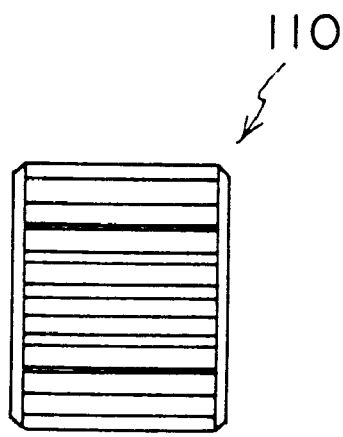
FIG. 13A is a front view of a roller shown in FIG. 9.
Figure 13B:
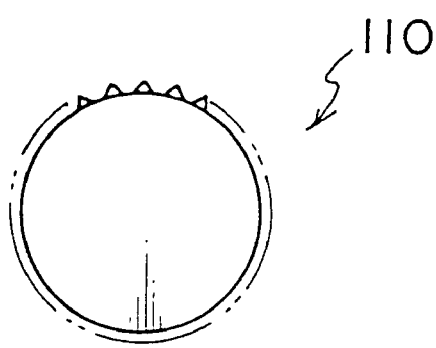
FIG. 13B is a plan view of the roller.

As illustrated in FIG. 12, three concave portions 108 are formed at the side of the inner periphery of the clutch portion 106 at intervals of 120 degrees. These concave portions 108 are connected together along a circumferential direction of the clutch portion 106 (that is, both ends of each concave portion 108 in the circumferential direction are respectively connected to ends of other concave portions 108). The concave portions 108 each include a wide portion and narrow portions at both ends thereof. A roller 110 is accommodated in each of the wide portions. As illustrated in FIG. 13, the outer peripheral surface of the roller 110 is subjected to parallel knurling in such a manner as in the intermediate portion 34B of the sleeve 34. These concave portions 108 and the rollers 110 correspond to a "clutch" of the present invention.

A piston 116 formed as a rack bar is disposed in the vicinity of the pinion teeth 104A of the above-described pinion 102 and is accommodated in a cylinder 114 of a cartridge 112 (see FIG. 11) so as to be movable in an axial direction of the cylinder 114. The piston 116 includes a circular plate-shaped piston portion 118 to which gas pressure is applied, and a rack portion 120 made upright on the piston portion 118. A piston ring 122 is mounted at the lower side of the piston portion 118. Further, rack teeth 120A engaging with the pinion teeth 104A are formed on one surface of the rack portion 120. The rack portion 120 is disposed at a position offset from the center of the circular plate-shaped piston portion 118 and is disposed so as to be movable in the axial direction within the range of dimension of an outer diameter of the clutch portion 106. Namely, the rack portion 120 is disposed so that a total length, in a predetermined direction, of the toothed portion 104 and the rack portion 120 in an engaged state is set within the range of dimension of the outer diameter of the clutch portion 106. The predetermined direction mentioned herein means a direction substantially perpendicular to a direction of a rotating shaft of the pinion 102 and to a direction to which the rack portion 120 moves.

A gas generator 124 (see FIG. 11) in which a gas generating agent (not shown) is accommodated is connected to a lower end of the cylinder 114 in which the above-described piston 116 is accommodated.

Next, an operation and effects of the present embodiment will be described.

When a tongue plate (not shown) through which a webbing 126 passes is engaged with a buckle device (not shown) by a vehicle occupant, the webbing 126 is pulled out from the spool 12 against urging force of a power spring. The vehicle occupant is brought into a state in which the webbing of a three-point type seat belt apparatus is applied thereto. Namely, a webbing 126 between a shoulder anchor (not shown) disposed above a center pillar and the tongue plate becomes a shoulder-side webbing, and a webbing 126 between the tongue plate and the buckle device becomes a lap-side webbing.

In a case in which a vehicle is caused to travel in the above-described state, when the vehicle decelerates rapidly, the pretensioner 100 operates. Namely, an ignition device operates and the gas generating agent accommodated in the gas generator 124 of the cartridge 112 combusts to allow generation of gas. The generated gas is supplied from the gas generator 124 to the lower end of the cylinder 114. Accordingly, the piston 116 accommodated in the cylinder 114 moves in the axial direction of the cylinder 114. When the piston 116 moves in the axial direction, the rack teeth 120A of the rack portion 120 of the piston 116 engages with the pinion teeth 104A of the toothed portion 104 of the pinion 102 so as to rotate the pinion 102 in the direction in which the webbing is taken up. For this reason, the clutch portion 106 integrated with the toothed portion 104 of the pinion 102 is also rotated in the same direction.

As a result, the rollers 110 held in the concave portions 108 of the clutch portion 106 move relatively from the wide portions to the narrow portions and the roller 110 is interposed between the inner peripheral surface of the clutch portion 106 and the outer peripheral surface of the intermediate portion 34B of the sleeve 34. The outer peripheral surface of the intermediate portion 34B of the sleeve 34 and the outer peripheral surface of the roller 110 are each subjected to parallel knurling, and therefore, they are brought into an engaged state. Accordingly, the pinion 102 and the sleeve 34 are brought into a state of being connected together via the clutch portion 106, and rotating force of the pinion 102 is directly transmitted to the sleeve 34.

The base portion 34A of the sleeve 34 and the spool shaft 12A of the spool 12 are engaged with each other by serration treatment or spline treatment. Therefore, when the sleeve 34 is rotated in the direction in which the Webbing is taken up, the spool 12 is also rotated in the direction in which the webbing is taken up. As a result, the webbing 126 is taken up by an amount corresponding to a moving stroke of the piston 116 and a vehicle occupant is thereby restrained.

Simultaneously with the above-described operation, the state of rapid deceleration of the vehicle is detected by the acceleration sensor 52. In other words, the ball 54 of the acceleration sensor 52 rolls on the sensor housing 56 to allow the sensor lever 58 to swing. As a result, the lock pawl 58A of the sensor lever 58 is engaged with the lock tooth 46A of the V gear 46 and the rotation of the V gear 46 in the direction in which the webbing is pulled out is prevented.

On the other hand, the spool 12 is about to rotate in the direction in which the webbing is pulled out due to a webbing tension caused by inertia movement of a vehicle occupant. Accordingly, relative rotation is caused between the spool 12 which is about to rotate in the direction in which the webbing is pulled out, and the V gear 46 which is prevented from rotating in the direction in which the webbing is pulled out. When the relative rotation is caused between the spool 12 and the V gear 46, as can be seen from the comparison of FIGS. 2 and 3, the guide pin 42D of the lock plate 42 held in the accommodating portion 40 formed in the holding portion 24C of the base lock 24 is guided by the guide hole 50 of the V gear 46 (that is, the guide pin 42D moves within the guide hole 50), the lock plate 42 is moved outward substantially in a radial direction of the base lock 24. Namely, the lock plate 42 is moved in a direction to which the lock teeth 42C of the lock plate 42 move close to the ratchet teeth. As a result, the lock teeth 42C of the lock plate 42 are engaged with the ratchet teeth 38A of the internal gear ratchet 38 provided in the first leg plate 16 of the frame 14.

When the lock teeth 42C of the lock plate 42 are engaged with the ratchet teeth 38A of the internal gear ratchet 38, reaction force caused by the engagement acts on the holding portion 24C of the base lock 24. The reaction force is caused by engagement between the high-strength lock teeth 42C and the high-strength ratchet teeth 38A at the time of rapid deceleration of a vehicle, and therefore, it becomes a considerably large force. Accordingly, the reaction force naturally acts on the torsion shaft 36 passing through the axial core portion of the base lock 24. Further, the end portion 36F of the torsion shaft 36 is supported by the boss 60A of the sensor holder 60 made of resin, and therefore, the reaction force acts on the boss 60A of the sensor holder 60 from the end portion 36F of the torsion shaft 36, and the boss 60A of the sensor holder 60 elastically deforms in the direction in which the reaction force acts, that is, in the direction opposite to that in which the lock plate 42 is engaged with the ratchet teeth 38A (the direction indicated by arrow P in FIG. 3). As a result, a portion of the outer periphery of the holding portion 24C of the base lock 24 (a region enclosed by the line indicated by arrow P in FIG. 3) is strongly pressed on the ratchet teeth 38A of the internal gear ratchet 38 of the frame 14. The base lock 24 is formed by die casting and is made of a relatively soft material. Accordingly, when the ratchet teeth 38A contacts by pressure the base lock 24, the base lock 24 plastically deforms so that the ratchet teeth 38A bite therein, thereby causing the portion of the outer periphery of the holding portion 24C to be directly engaged with the ratchet teeth 38A. As a result, the rotation of the spool 12 in the direction in which the webbing is pulled out is prevented and the webbing take-up device is brought into a locked state.

The foregoing description was given of basic operations of the webbing take-up device 10 and the pretensioner 100 according to the present embodiment. As can be seen therefrom, in the present embodiment, the pretensioner 100 using a rack and pinion driving mechanism is constructed in such a manner that the pinion 102 rotating by driving force of the piston 116 which is structured as the rack bar is directly connected to the axial end of the sleeve 34 via the clutch portion 106, and therefore, intermediate gears required by a conventional system are not necessary. For this reason, it becomes unnecessary to provide a space of installation for the intermediate gears in the pretensioner 100. Accordingly, the pretensioner 100 can as a whole be made smaller both in axial and radial directions thereof.

In the present embodiment, particularly, the pinion 102 is formed in such a manner that the toothed portion 104 and the clutch portion 106 are integrated with each other. Therefore, as compared with a case in which the toothed portion 104 and the clutch portion 106 are provided separately, the space of installation therefor can be further reduced. Accordingly, the entire size of the pretensioner 100 can be made even smaller. In addition, the number of parts can also be reduced and the structure of the pretensioner can be simplified accordingly.

Further, in the present embodiment, the piston 116 is structured to include the piston portion 118 and the rack portion 120. The rack portion 120 is made upright at a position offset from the center of the piston portion 118 and is disposed so as to move in the axial direction of the piston 116 within the range of dimension of the outer diameter of the clutch portion 106. Accordingly, there is no possibility that the rack and pinion type driving mechanism be made larger outwardly in the radial direction of the clutch portion 106. As a result, in the present embodiment, the pretensioner 100 can as a whole be made much smaller.

Moreover, in the present embodiment, as described above, the pinion 102 is directly connected to the sleeve 34 which forms a part of the winding shaft, and therefore, a transmission path of driving force between the piston 116 (the rack bar) set as the driving starting point and the driving end point (that is, the sleeve 34) becomes shorter. Accordingly, a speed of response of the pretensioner 100 can be increased.

In the present embodiment, the present invention is applied to the webbing take-up device 10 equipped with the pretensioner 100 and the force limiter, but the present invention is not limited to the same. The pretensioner according to the present invention may also be applied to a webbing take-up device equipped with no force limiter.

Further, in the present embodiment, the clutch portion 106 is integrated with the pinion 102, but a pinion and a clutch may also be formed as separate components.

Still further, the structure of the present embodiment is such that the rack portion 120 moves in the axial direction within the range of dimension of the outer diameter of the clutch portion 106 due to the rack portion 120 being disposed offset from the center of the piston portion 118. However, a rack portion may be disposed coaxially with the center of a piston portion.

Moreover, in the present embodiment, the clutch using the rollers 110 is provided, but the present invention is not limited to the same. Various types of clutches, such as a clutch using balls in place of the rollers 110 can be adopted.

As described above, in accordance with the first aspect of the present invention, there is provided the pretensioner which is integrated with a webbing take-up device in which a vehicle occupant-restraining webbing is wound on a winding shaft, and at the time of rapid deceleration of a vehicle, which rotates the winding shaft by a predetermined amount in a direction in which the webbing is taken up by using a rack and pinion type driving mechanism, wherein the driving mechanism comprises: a piston disposed so as to be movable in a cylinder in an axial direction thereof and including a rack portion provided with rack teeth, said piston being provided to move at the time of rapid deceleration of the vehicle; and a pinion disposed so as to engage with the rack teeth and directly connected to an axial end of the winding shaft via a clutch which is connected to the winding shaft, only at the time of rapid deceleration of the vehicle. Accordingly, intermediate gears conventionally used become unnecessary, and as a result, the overall size of the pretensioner can be made smaller both in axial and radial directions thereof.

In accordance with the second aspect of the present invention, in the structure provided by the first aspect, the pinion includes: a toothed portion in which pinion teeth engaging with the rack teeth are formed; and a clutch portion formed coaxially and integrally with the toothed portion and including the clutch at the side of an inner periphery thereof. Accordingly, as compared with a case in which the toothed portion and the clutch portion are provided separately, the space of installation therefor can be further reduced, and the number of parts can also be reduced. As a result, the overall size of the pretensioner can be made even smaller and the structure thereof can be simplified.

In accordance with the third aspect of the present invention, in the structure provided by the second aspect, the piston includes a piston portion to which gas pressure is applied, and the rack portion is made upright at a position offset from the center of the piston portion, the rack portion being disposed so as to move within a range of dimension of an outer diameter of the clutch portion. Accordingly, there is no possibility that the rack and pinion type driving mechanism be made larger outwardly in the radial direction of the clutch portion. As a result, the overall size of the pretensioner can be made much smaller.

What is claimed is:

1. A pretensioner which is integrated with a webbing take-up device in which a vehicle occupant-restraining webbing is wound on a winding shaft, and at the time of rapid deceleration of a vehicle, which rotates the winding shaft by a predetermined amount in a direction in which the webbing is taken up by using a rack and pinion type driving mechanism, said pretensioner comprising:

the winding shaft including:

a shaft; and a sleeve portion, one end portion of the sleeve portion being connected to an end portion of the shaft, wherein the driving mechanism comprises:

a piston disposed so as to be movable in a cylinder in an axial direction thereof and including a rack portion provided with rack teeth, said piston being provided to move at the time of rapid deceleration of the vehicle; and a pinion disposed so as to engage with the rack teeth and directly connected to an axial end of the winding shaft via a clutch which is connected to the winding shaft, only at the time of rapid deceleration of the vehicle, the pinion including a toothed portion in which pinion teeth engaging with the rack teeth are formed and which covers another end portion of the sleeve portion; and a clutch portion which covers a middle portion of the sleeve portion and formed coaxially and integrally in one piece with the toothed portion wherein a clutch mechanism is positioned at a side of an inner periphery thereof, and wherein roller members are disposed between an inner periphery portion of the clutch portion and an outer periphery portion of the middle portion of the sleeve portion so as to form the clutch mechanism.

2. A pretensioner according to claim 1, wherein the piston includes a piston portion to which gas pressure is applied, and the rack portion is made upright at a position offset from the center of the piston portion, the rack portion being disposed so as to move within a range of dimension of an outer diameter of the clutch portion.

3. A pretensioner according to claim 1, wherein the rack portion is disposed so as to move within a range of dimension of an outer diameter of the clutch portion.

4. A pretensioner according to claim 1, wherein the rack portion is disposed so as to move within a range of dimension of an outer diameter of the clutch portion along a predetermined direction, the predetermined direction being a direction substantially perpendicular to a direction of a rotating shaft of the pinion.

5. A pretensioner which is integrated with a webbing take-up device in which a vehicle occupant-restraining webbing is wound on a winding shaft, and at the time of rapid deceleration of a vehicle, which rotates the winding shaft by a predetermined amount in a direction in which the webbing is taken up by using a rack and pinion type driving mechanism, said pretensioner comprising:

the winding shaft including:

a shaft; and a sleeve portion, one end portion of the sleeve portion being connected to an end portion of the shaft, the driving mechanism comprising:

a piston disposed so as to be movable in a cylinder in an axial direction thereof and including a rack portion provided with rack teeth, said piston being provided to move at the time of rapid deceleration of the vehicle; and a pinion disposed so as to engage with the rack teeth and directly connected to an axial end of the winding shaft via a clutch mechanism which is connected to the winding shaft, only at the time of rapid deceleration of the vehicle, wherein the pinion includes:

a toothed portion in which pinion teeth for engaging with the rack teeth are formed, and which covers another end portion of the sleeve portion; and a clutch portion which covers a middle portion of the sleeve portion so as to form the clutch mechanism with the middle portion, wherein roller members are disposed between an inner periphery portion of the clutch portion and an outer periphery portion of the middle portion of the sleeve portion so as to form the clutch mechanism, and wherein the toothed portion and the clutch portion are formed coaxially and integrally such that the pinion is made from one piece.

6. A pretensioner according to claim 5, wherein an outer periphery portion of the middle portion and outer periphery portions of the roller members are each subjected to parallel knurling.

7. A pretensioner according to claim 5, wherein a diameter of the other end portion of the sleeve portion is smaller than that of the middle portion of the sleeve portion.

* * * * *